Patented Jan. 2, 1945

2,366,315

UNITED STATES PATENT OFFICE 2,366,315

PURIFICATION OF DIOLEFINS

David Craig, Silver Lake, Ohio, assignor, by mesne assignments, to The B. F. Goodrich Company, Akron, Ohio, a corporation of New York No Drawing. Application July 26, 1941,
Serial No. 404,197

5 Claims. (Cl. 260—681.5)

This invention relates to the preparation and purification of diolefins, and particularly to a method whereby butadiene may be separated from $C_4$-monoolefins and the $C_4$-monoolefins may by the same process be converted into products from which butadiene can be readily prepared.

It is well known that mixtures of $C_4$-hydrocarbons are formed in many hydrocarbon cracking processes. It is difficult to obtain a separation of the unsaturated $C_4$-hydrocarbons because of the proximity of the boiling points; isobutene, 1-butene, butadiene, and the 2-butenes all boiling in about a 10° C. range. The separation of isobutene and 1-butene from butadiene is particularly difficult since these materials boil within about 2° C. of each other.

I have discovered that the separation of butadiene from $C_4$-monoolefins can be facilitated by treating a mixture of the unsaturated hydrocarbons with a chlorinating agent to selectively chlorinate $C_4$-monoolefins, and separating the butadiene from the chlorinated hydrocarbons. The chlorinated hydrocarbons have such high boiling points that good separation of butadiene therefrom may be obtained by simple distillation. The chlorinated hydrocarbons may be further treated by known methods to form butadiene. In this manner a large percentage of butadiene may be obtained from the hydrocarbons in a mixture of $C_4$-monoolefins and butadiene, and the chlorination process serves not only as a means of separating the butadiene from the monoolefins but also as a step in the conversion of the monoolefins to diolefins. It was unexpected that the $C_4$-monoolefins could be selectively chlorinated in the presence of butadiene in view of the fact that diolefins are ordinarily more reactive than the monoolefins.

As an example of the method of this invention, a mixture of monoolefins and diolefins containing about 40% by weight of butadiene (by which is meant butadiene-1,3), 30% of isobutene, and 30% of 1-butene and 2-butenes was dissolved in an equal weight of chloroform. The mixture was placed in a glass flask and cooled to —66° C. 30% by weight of chlorine based on the hydrocarbons was introduced beneath the surface of the solution during a twenty minute interval while the temperature rose to —41° C. The evolution of hydrogen chloride was noted at this point, so a small sample of the reaction mixture was taken and heated to 20° C. The unreacted hydrocarbons which distilled off were found to contain 77% of butadiene. About 2% more chlorine was added to the original reaction mixture as the temperature was allowed to rise to —10 C. The passage of chlorine into the mixture was then stopped, and the unreacted hydrocarbons were distilled off and found to contain 81% of butadiene. The total amount of butadiene recovered by this process constituted 81% of the butadiene originally present in the mixture.

The residue remaining in the flask after the removal of the unreacted hydrocarbons by distillation consisted mainly of a chloroform solution of dichlorobutanes formed not only from the isobutene, but also from other monoolefins. The dichlorobutanes may be converted into butadiene by any of the well known methods such as passing the mixed dichlorobutanes freed from the solvent over soda lime at 700°–730° C. The conversion of the dichlorobutanes to butadiene may also be effected by the method described in U. S. Patent No. 1,198,943, or any other desired method of which a number are now known.

It will be obvious that the specific conditions under which the mixture of $C_4$-monoolefins and diolefins is treated with a chlorinating agent may be widely varied, any method of chlorination which selectively chlorinates the monoolefins being usable. When chlorine is employed, the best results are obtained by performing the reaction below 0° C., preferably below —20° C. The chloroform may be replaced by carbon tetrachloride or other solvent which will be inert under the conditions employed, or the solvent may be dispensed with entirely. It is also possible to conduct the chlorination in the gas phase rather than in the liquid phase at a pressure sufficiently reduced to permit the chlorination to be effected at the desired low temperature. Such a process can be operated continuously in a packed column by introducing the mixed hydrocarbons at different points or at the same point in the column and allowing the reaction between the chlorine and the monoolefins to take place within the column, the high-boiling dichlorobutanes being withdrawn from the bottom of the column, and the purified butadiene being withdrawn from the top of the column.

Other processes may also be devised which take advantage of the fact that $C_4$-monoolefins will react with chlorine or other chlorinating agents in the presence of butadiene. For instance, a mixture of butadiene and $C_4$-monoolefins may be placed in a kettle under a packed column connected to a reflux condenser. When the kettle is heated, the mixture passes up through the column and is met by a stream of chlorine dissolved in dichlorobutanes descending the column. The C₄-monoolefins react with the chlorine to form additional dichlorobutanes which collect in the kettle. When all of the C₄-monoolefins have reacted, the stream of chlorine dissolved in dichlorobutanes is shut off, the reflux condenser is disconnected, and the butadiene is distilled from the high-boiling chlorinated hydrocarbons, or separated therefrom by any other desired method such as extraction with a selective solvent. The above process must be carried on at a somewhat higher temperature than the optimum for selective chlorination, but satisfactory separation may be obtained and the dichlorobutanes may then be converted into additional butadiene.

Other chlorinating agents than chlorine may be employed, although the results are not in general as satisfactory. Marked separation of diolefins from monoolefins may be obtained by reaction with hydrogen chloride. As an example, a mixture of unsaturated C₄-hydrocarbons containing isobutene, butene-1, the 2-butenes and 48% by weight of butadiene, was placed in a flask immersed in an acetone-dry ice bath. Twenty-five percent by weight, based on the hydrocarbons, of hydrogen chloride were introduced into the flask and allowed to remain there for fifteen minutes. The unreacted hydrocarbons in the flask were distilled off and found to contain 68.5% of butadiene. In this case, the chlorinated hydrocarbons consist of monochlorobutanes. These may be converted into butadiene through a chlorination process followed by dehydrochlorination as disclosed by Perkin, J. Soc. Chem. Ind., 31, 618 (1912).

The method of this invention is also applicable to the separation of other diolefins containing the configuration

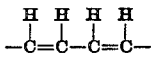

from monoolefins having a boiling point near the boiling point of the diolefin. Thus piperylene may be separated from 2-methyl butene-1 which boils within about 10° C. of piperylene by chlorinating the mixture at a low temperature, —20° C. for instance, and distilling the piperylene from the dichloropentane. This method does not work satisfactorily, however, for the separation of monoolefins from diolefins such as isoprene and 2,3-dimethyl butadiene which do not contain hydrogen on the carbon atoms between the conjugated double bonds.

Although I have herein disclosed a specific embodiment of my invention, I do not intend to limit the invention solely thereto for many variations and modifications such as using different methods to selectively chlorinate the monoolefins and to convert the chlorinated hydrocarbons to butadiene are within the spirit and scope of the invention as defined in the appended claims.

I claim:

1. In a method of recovering butadiene from a mixture of butadiene and C₄-monoolefins, the steps which comprise reacting said mixture with chlorine under such conditions that the C₄-monoolefins are substantially converted into dichlorobutanes while the butadiene is substantially unaffected, and separating the butadiene from the dichlorobutanes.

2. In a method of recovering butadiene from a mixture of butadiene and C₄-monoolefins comprising isobutene, the steps which comprise reacting said mixture with chlorine at a temperature below 0° C. whereupon said monoolefins are substantially converted into chlorinated monoolefins while the butadiene is substantially unaffected, and distilling the butadiene from the reaction mixture.

3. In a method of recovering butadiene from a mixture comprising butadiene, isobutene, 1-butene, and 2-butenes, the steps which comprise reacting said mixture with chlorine at a temperature below —20° C. whereupon said isobutene, 1-butene and 2-butenes are substantially converted into dichlorobutanes while the butadiene is substantially unaffected, and separating the butadiene from the dichlorobutanes.

4. In a method of recovering butadiene from a mixture of butadiene and C₄-monoolefins, the steps which comprise reacting said mixture with chlorine at a temperature below —20° C. and in the presence of a solvent which does not react with chlorine under these conditions whereupon said C₄-monoolefins are substantially converted into dichlorobutanes while the butadiene is substantially unaffected, and separating the butadiene from the dichlorobutanes.

5. In a method of recovering a diolefin containing the configuration

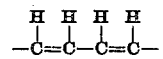

from a mixture of said diolefin with monoolefins of similar boiling points, the steps which comprise reacting said mixture with chlorine under such conditions that the monoolefins are substantially converted into dichloroalkanes while the diolefin is substantially unaffected, and separating the diolefin from the dichloroalkanes.

DAVID CRAIG.